(12) United States Patent
Gray

(10) Patent No.: US 7,194,800 B2
(45) Date of Patent: *Mar. 27, 2007

(54) INTERNAL TUBE EXTRACTING DEVICE WITH A CYLINDRICAL COLLAPSING WEDGE

(75) Inventor: Luke G. M. Gray, Waterloo (CA)

(73) Assignee: Babcick & Wilcox Canada, Ltd., Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/862,632

(22) Filed: Jun. 7, 2004

(65) Prior Publication Data

US 2005/0268451 A1    Dec. 8, 2005

(51) Int. Cl.
*B23P 15/26* (2006.01)
*B23P 6/00* (2006.01)

(52) U.S. Cl. .................. 29/727; 29/726; 29/890.031; 29/426.4; 29/426.5

(58) Field of Classification Search .......... 29/890.031, 29/726, 726.1, 727, 426.1, 426.4, 426.5
See application file for complete search history.

(56) References Cited

U.S. PATENT DOCUMENTS

| | | | |
|---|---|---|---|
| 1,753,677 A | 4/1930 | Andresen | |
| 2,013,933 A | * 9/1935 | Wagner | 29/726 |
| 3,057,631 A | 10/1962 | LaFleur | |
| 3,104,461 A | 9/1963 | Nieglos | |
| 3,245,247 A | 4/1966 | Valente | |
| 3,507,028 A | 4/1970 | Stellatella | |
| 3,613,489 A | 10/1971 | Randich | |
| 3,791,011 A | 2/1974 | Keys | |
| 3,857,158 A | 12/1974 | Costello | |
| 3,979,816 A | 9/1976 | Green | |
| 4,000,556 A | 1/1977 | Ciminero | |
| 4,053,062 A | 10/1977 | Travis | |
| 4,180,903 A | 1/1980 | Hannigan, Jr. | |
| 4,231,246 A | 11/1980 | Gorenc et al. | |
| 4,233,730 A | 11/1980 | Godbe | |
| 4,280,274 A | 7/1981 | Filer | |
| 4,283,826 A | 8/1981 | Miller | |
| 4,312,124 A | 1/1982 | Calhoun | |
| 4,355,450 A | 10/1982 | Miller | |
| 4,369,569 A | 1/1983 | Armstrong, Jr. et al. | |
| 4,406,856 A | 9/1983 | Wilkins et al. | |
| 4,471,516 A | 9/1984 | Godbe | |
| 4,586,695 A | 5/1986 | Miller | |
| 4,627,155 A | 12/1986 | Mancabelli | |
| 4,643,247 A | 2/1987 | Tomasula | |
| 4,670,975 A | 6/1987 | Dettinger | |

(Continued)

*Primary Examiner*—Marc Jimenez
(74) *Attorney, Agent, or Firm*—Michael J. Seymour; Eric Marich

(57) ABSTRACT

The invention is related to a tube extracting device for removing a tube from a conventional drum of a boiler or heat exchanger. The device is positioned inside the drum. The device includes a hollow cylindrical wedge which cylindrically collapses a tube inwardly upon driving the wedge between the tube hole and outer tube wall. The wedge has longitudinal ridges on its inner surface and inwardly tapered edges at its end which is driven into the tube hole such that the tube may be readily inwardly collapsed. Upon retracting the wedge from the tube hole, the wedge engages the tube and the tube is removed from the drum inside the wedge.

17 Claims, 3 Drawing Sheets

U.S. PATENT DOCUMENTS

| | | |
|---|---|---|
| 4,776,072 A | 10/1988 | Jaquier |
| 4,959,899 A | 10/1990 | Martin |
| 5,168,623 A | 12/1992 | Rabe |
| 5,276,965 A | 1/1994 | Hahn et al. |
| 5,621,966 A | 4/1997 | Kvenvold et al. |
| 5,826,334 A | 10/1998 | Weeks et al. |
| 5,893,209 A | 4/1999 | Weeks et al. |
| 5,974,642 A | 11/1999 | Weeks et al. |
| 6,182,354 B1 | 2/2001 | Weeks |
| 6,205,632 B1 | 3/2001 | Weeks et al. |
| 6,209,181 B1 | 4/2001 | Weeks |
| 6,216,326 B1 | 4/2001 | Ritter et al. |
| 6,430,790 B1 | 8/2002 | Haycook |

* cited by examiner

INTERNAL TUBE EXTRACTING DEVICE WITH A CYLINDRICAL COLLAPSING WEDGE

FIELD AND BACKGROUND OF INVENTION

The present invention relates generally to the field of tube extracting devices, and more particularly to an improved tube extracting device for facilitating the removal of tubes from different types of structures, such as boilers, condensers, evaporators, and the like.

A typical heat exchanger comprises a pair of parallel tube sheets, a plurality of baffle plates, and a plurality of heat exchanger tubes. The tube sheets are located at the ends of the heat exchanger. The baffle plates are positioned between the tube sheets and generally parallel thereto. The tubes extend between the tube sheets and through the baffle plates and are supported by the tube sheets. The tube sheets and baffle plates have a series of aligned holes formed therein, and the tubes are inserted through these holes and then expanded in the areas of the tube sheets into fluid-tight pressure contact therewith.

Because of malfunctions or normal preventive maintenance, it may be necessary to remove one or all of the tubes from the structure. To replace the tubes they are generally cut between the tube ends and the expanded ends of the tubes forcibly withdrawn from the tube sheets an inch or two until they can be withdrawn by hand.

Various tools have been suggested for removing these tubes by using wedges that are driven inside a bore of a structure, expanded for engaging the inside wall of a tube and retracted for pulling the tube out of the bore.

U.S. Pat. No. 4,355,450 to Miller discloses a tube extracting mechanism having a wedge with expandable circumferential gripping teeth.

U.S. Pat. No. 3,791,011 to Keys shows a tube pulling device with longitudinally fixed radially expanding gripping means which engages the tube wall for withdrawal of the tube from the tube sheet.

U.S. Pat. No. 3,507,028 to Stellatella shows a hydraulic tube puller with radial expansion of an inner end portion of a tube gripping member into the tube wall.

The primary problem with all these prior art structures is that they impose an expansion force on the tube precisely at the point where it is engaged with the tube sheet which can damage the metal between adjacent holes and cause the holes in the tube sheet to enlarge and not properly grip a new tube when it is expanded. Moreover, the prior art devices require additional moving parts which increase the likelihood of malfunctions and breakage of the device, which results in an increase of down-time of the structure for repairs.

The apparatus of the instant invention does not expand the tube ends radially but utilizes longitudinal wedge movement to cylindrically collapse the tube being extracted, and possesses many other advantages.

SUMMARY OF INVENTION

It is an object of the invention to provide a tube extractor that is simple to use and does not cause damage to the tube sheet upon tube withdrawal.

A further object of the invention is to provide a tube extractor which is positioned inside the structure for removal of the tubes.

A further object of the invention is to provide a tube extractor which is safe in use.

A further object of the invention is to provide a tube extractor which is fast in operation and light weight.

Accordingly, an object of the invention is to provide a tube extraction device which has a wedge having a cylindrical member with a top end and a bottom end, a plurality of longitudinal ridges formed on the interior surface of the cylindrical member and a plurality of tapered edges formed at the bottom end of the cylindrical member. A mounting means mounts the wedge inside the drum substantially concentric with the tube hole. A ram connected to the wedge moves the bottom end of the wedge into the tube hole so that the tube collapses therein and is removed with the wedge upon retracting the wedge from the tube hole.

It will be seen that use of the device is very rapid and removal of a tube from its secured connection in the drum opening is materially facilitated, thereby materially reducing the costs involved in retubing a structure or replacing a tube. The tool is light and portable enough so that a single workman utilizing the tool can readily and rapidly accomplish the job of removing the tubes from a structure. In the past, such a retubing operation normally required several workmen.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
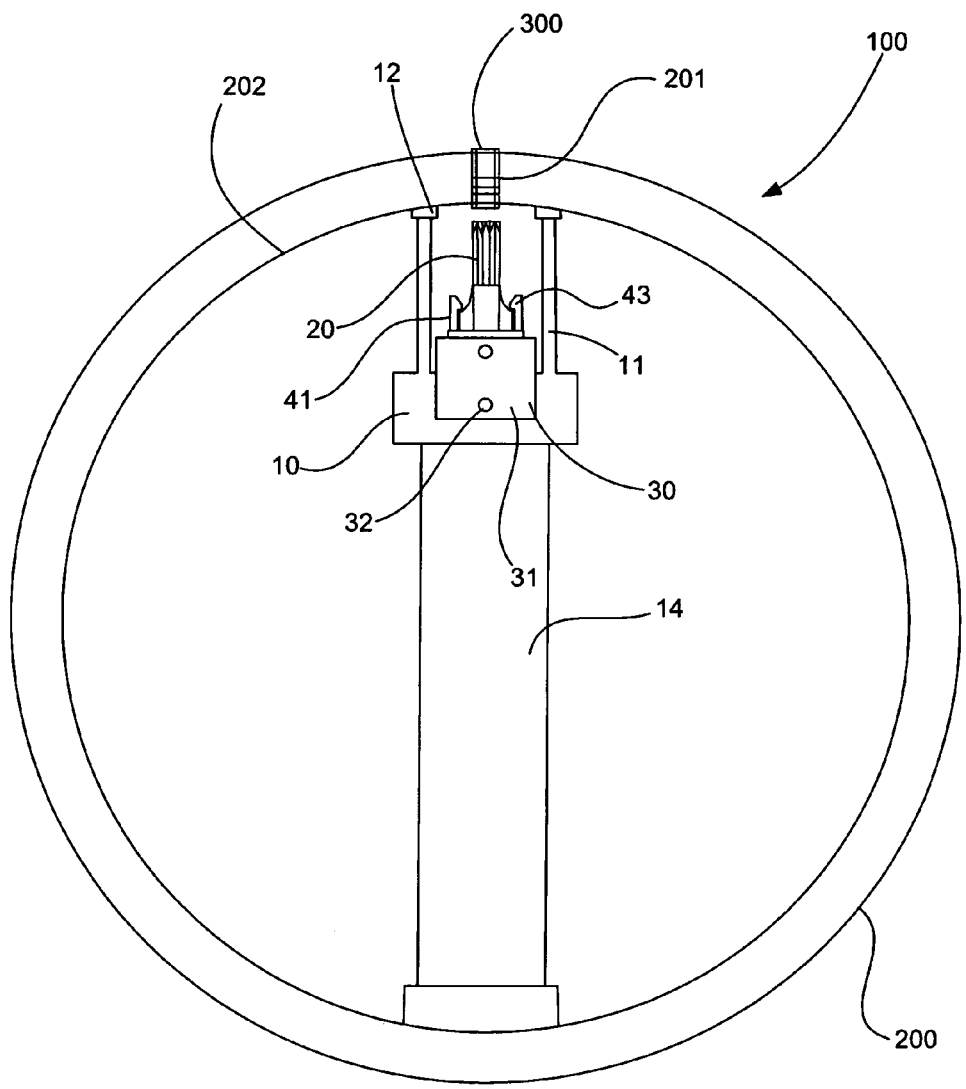
FIG. 1 is a front elevational view of the tube extracting device of the invention positioned inside the drum.

Referring now to the drawings, in which like reference numerals are used to refer to the same or similar elements, FIG. 1 shows a device 100 positioned inside the drum 200 to extract a tube 300 from a tube hole 201. The device 100 includes a housing 10 with legs 11 that extend to the drum's interior surfaces 202 at opposite sides of the tube hole 201. The housing 10 and the legs 11 are preferably a unitary structure. The legs have feet 12 which stabilize the device 100 during operation so that the housing 10 does not slip or fall out of position. A stand 14 is provided for supporting the device 100. The stand 14 extends from the housing 10 to an interior surface 202 opposite the tube hole 201.

The force required for tube extraction is generated by a conventional ram 30, preferably hydraulically operated, as shown in FIG. 1. The ram 30 includes an outer wall 31 and typical internal components (not shown), such as a piston, a cylinder, control valves and a hydraulic return. The ram 30 is preferably coupled to a typical hydraulic pump (not shown) which powers the ram 30. The hydraulic pump provides hydraulic fluid to the cylinder, causing an outward extension of the piston. A port 32 is connected by a pipe (not shown) to the hydraulic pump. When the pressurized fluid is admitted through the port 32, it will force the piston in a direction toward the tube hole 201. A wedge 20 can be attached to the piston by conventional means. Fingers 43 reach around the wedge 20 to provide additional stability and assist in retraction of wedge 20 from tube hole 201.

Figure 2:
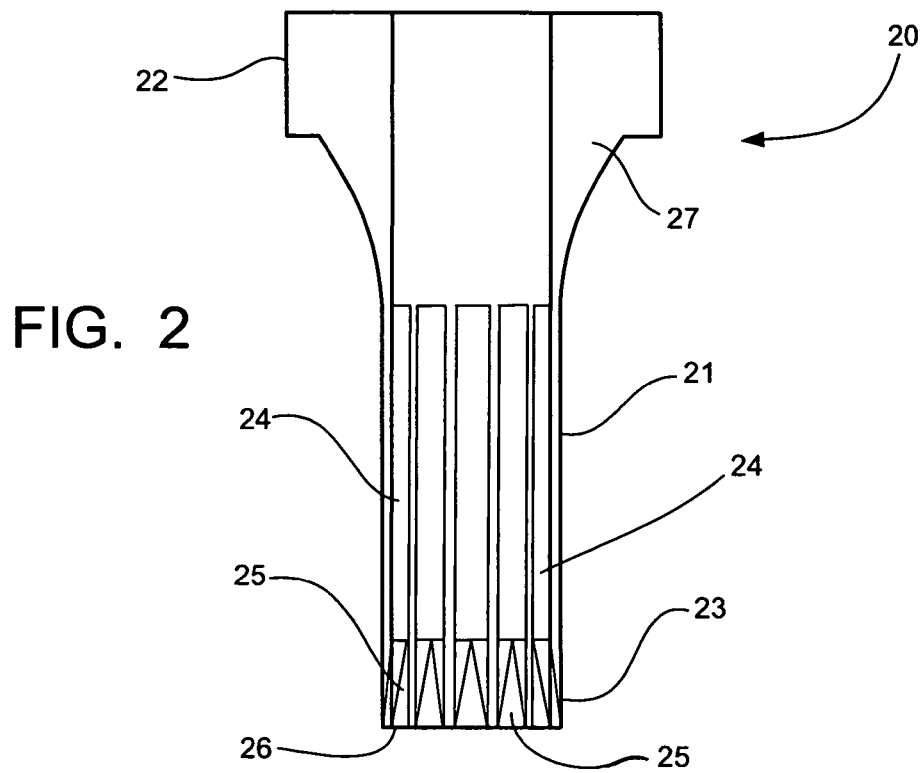
FIG. 2 is a side elevational view of the wedge of the invention.
Figure 3:
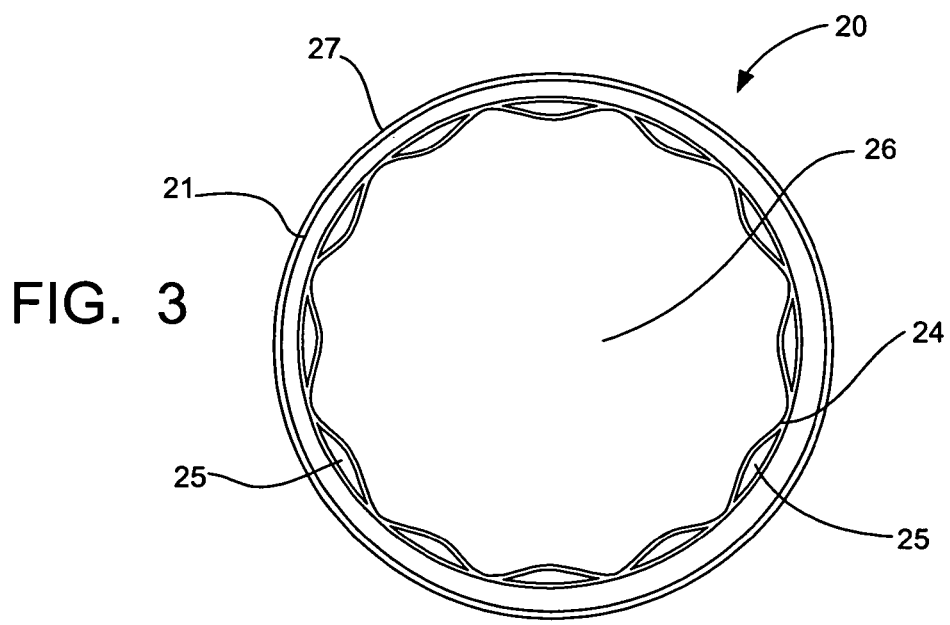
FIG. 3 is a bottom view of the wedge of the invention.

A wedge 20, as shown in FIGS. 2 and 3, is connected to or driven by the ram 30. The wedge 20 has a cylindrical body 21 having a top end 22 and a bottom end 23. A plurality of longitudinal ridges 24 are provided on the interior surface of the cylindrical body 21. The longitudinal ridges 24 are preferably parallel the center axis of the cylindrical body 21. As each of the longitudinal ridges 24 approach the bottom end 23 they taper down or outwardly toward the tube hole 201, away from the center. The end of the wedge 26 preferably has a lateral dimension that is about equal to the diameter of the tube 300. As the tapered edges 25 come to the bottom end 23 they come to a point which will be the edge/point that will be forced between the tube and the hole. The end of the tube will also need to be tapered 400 to allow the wedge to begin between the tube 300 and the tube hole 201. The top end 22 of the wedge 20 is preferably provided with a circular flange 27 having a wider diameter than the cylindrical body 21.

The wedge 20 is to be in alignment with the tube hole 201, preferably so that the cylindrical body 21 and the tube hole 201 are concentric and once the wedge 20 engages the tube hole 201, this then becomes a guide. Two members 41 extend from opposite sides of the ram 30. The ram 30 and members 41 form a slot 42 for receiving the wedge 20. Each member 41 has fingers 43 that clamps over the top end 22 of the wedge 20 for holding the wedge 20.

Figure 4:
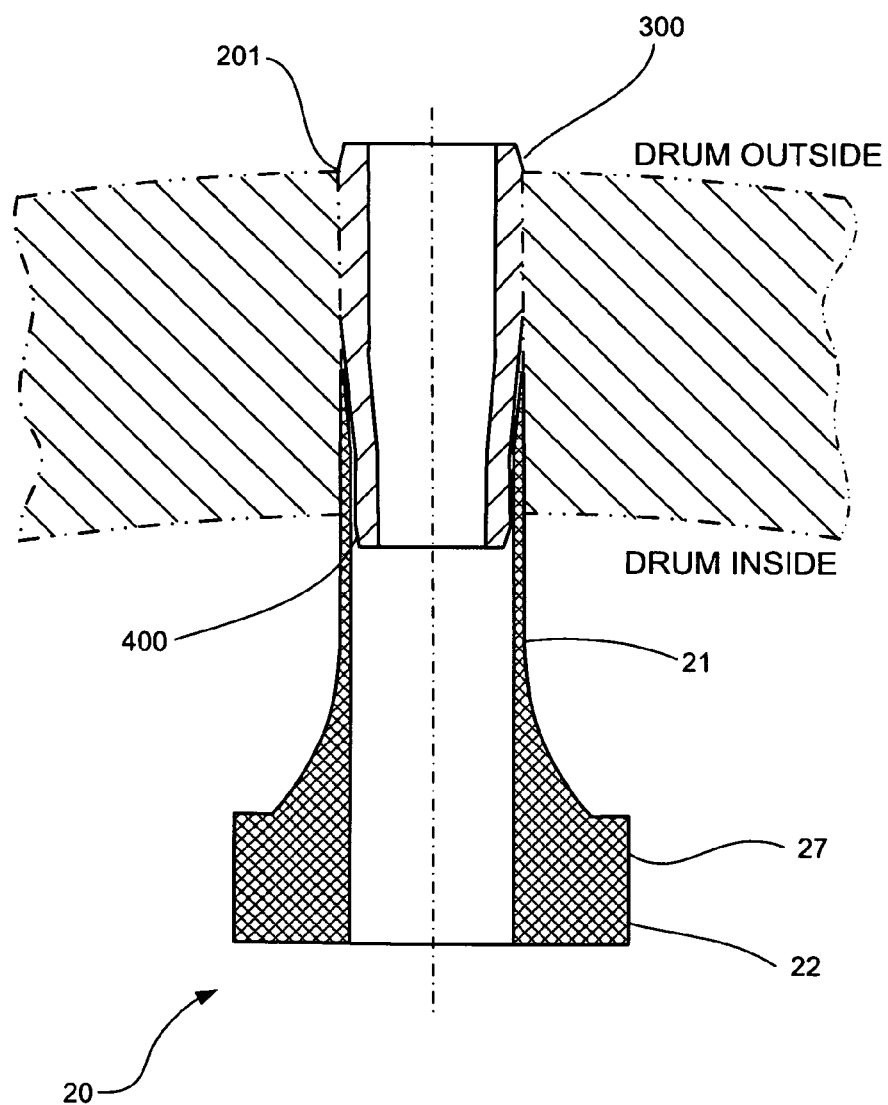
FIG. 4 is a side view of the wedge cylindrically encompassing and collapsing a tube within a tube hole

FIG. 1 illustrates the position of the structure prior to the operation of the actuating pressure. A pump (not shown) pumps fluid under pressure through the pipe into port 32 and into the cylinder. The pressurized fluid causes the piston to enter into a forward stroke, which, in turn, causes the ram 30 to move axially toward the tube hole 201. The ram 30 inserts the wedge 20 into the tube hole 201. The tapered edges 25 of the wedge 20 allow for a smooth initial interface with the tube 300. The wedge 20 engages the outer wall of the tube 300 as it moves through the tube hole 201, as seen in FIG. 4. Since the diameter of the wedge 20 is about equal to the diameter of the tube 300, the tube 300 readily collapses inwardly inside the wedge 20 as the wedge 20 moves through the tube hole 201 in response to the longitudinal force exerted by the ram 30. Upon reversing the stroke of the piston, as is well-known in the prior art, the wedge 20 is retracted from the tube hole 201. The wedge 20 pulls the collapsed tube 300 from the tube hole 201 upon retraction. When the extraction of the tube 300 is completed, the operator shuts off the pump and the pressure behind the piston drops. The ram 30 is again stationary and in its starting position.

While a specific embodiment of the invention has been shown and described in detail to illustrate the application of the principles of the invention, it will be understood that the invention may be embodied otherwise without departing from such principles.

We claim:

1. A tube extraction device for removing a tube from a drum, the tube extraction device comprising:
    a wedge having a cylindrical member with a top end and a bottom end,
    a plurality of longitudinal ridges formed on the interior surface of the cylindrical member, and a plurality of tapered edges formed at the bottom end of the cylindrical member;
    a means for moving the bottom end of the wedge in a tube hole so that the tube collapses therein and is removed with the wedge upon retracting the wedge from the tube hole; and
    a means for mounting the wedge inside the drum so that the wedge is substantially concentric with the tube hole.

2. The tube extraction device for removing a tube from a tube hole in a drum as claimed in claim 1, wherein the means for mounting the wedge inside the drum comprises a housing connected to ram, at least two legs extending from the housing to interior surfaces of the drum at opposite sides of the tube hole, the legs having feet that stabilize the device on the interior surfaces of the drum during operation of the device, and a stand that extends from the housing to an interior surface of the drum opposite the tube hole.

3. A tube extraction device for removing a tube from a tube hole in a drum as claimed in claim 2, wherein the housing and the legs form a unitary structure.

4. A tube extraction device for removing a tube from a tube hole in a drum as claimed in claim 2, wherein the ram is hydraulically powered.

5. A tube extraction device for removing a tube from a tube hole in a drum as claimed in claim 2, further comprising a clamping mechanism for clamping the top end of the wedge to the ram.

6. The tube extraction device for removing a tube from a tube hole in a drum as claimed in claim 5, wherein the clamping mechanism comprises at least two members extended from the ram, each member having an extension for clamping the top end of the wedge.

7. The tube extraction device for removing a tube from a tube hole in a drum as claimed in claim 1, wherein the cylindrical member has a center axis and the longitudinal ridges are parallel the center axis.

8. A tube extraction device for removing a tube from a tube hole in a drum as claimed in claim 1, wherein the top end of the wedge comprises a circular flange.

9. The tube extraction device for removing a tube from a tube hole in a drum as claimed in claim 1, wherein the bottom end of the wedge has a flat face parallel the tube hole.

10. A tube extraction device for removing a tube from a tube hole in a drum, the tube extraction device comprising:
    a housing having at least two legs extended to interior surfaces of the drum at opposite sides of the tube hole, the legs having feet that stabilize the device on the interior surfaces of the drum during operation of the device; a ram mounted to the housing; and a wedge having a cylindrical member with a top end and a bottom end, a plurality of longitudinal ridges formed on an interior surface of the cylindrical member, a plurality of tapered edges formed at the bottom end of the cylindrical member and a flat face parallel the tube hole, the wedge being mounted to the ram so that the cylindrical body of the wedge is concentric with the tube hole.

11. The tube extraction device for removing a tube from a tube hole in a drum as claimed in claim 10, wherein the housing and the legs form a unitary structure.

12. A tube extraction device for removing a tube from a tube hole in a drum as claimed in claim 10, wherein the cylindrical member has a center axis and the longitudinal ridges are parallel the center axis.

13. A tube extraction device for removing a tube from a tube hole in a drum as claimed in claim 10, wherein the ram is hydraulically powered.

14. A tube extraction device for removing a tube from a tube hole in a drum as claimed in claim 10, wherein the top end of the wedge comprises a circular flange.

15. A tube extraction device for removing a tube from a tube hole in a drum as claimed in claim 10, further comprising a clamping mechanism for clamping the top end of the wedge to the ram.

16. The tube extraction device for removing a tube from a tube hole in a drum as claimed in claim 15, wherein the clamping mechanism comprises at least two members extended from the ram, each member having an extension for clamping the top end of the wedge.

17. The tube extraction device for removing a tube from a tube hole in a drum as claimed in claim 10, wherein the bottom end of the wedge has a flat face parallel the tube hole.

* * * * *